(12) United States Patent
Choung et al.

(10) Patent No.: US 10,208,640 B2
(45) Date of Patent: Feb. 19, 2019

(54) EXHAUST GAS PURIFICATION APPARATUS AND METHOD FOR CONTROLLING THE SAME

(71) Applicants: Hyundai Motor Company, Seoul (KR); Kia Motors Corporation, Seoul (KR); Hyundai Kefico Corporation, Gunpo-si (KR)

(72) Inventors: Jin Woo Choung, Suwon-si (KR); SooMin Lee, Seongnam-si (KR); SungJae Kim, Gwacheon-si (KR)

(73) Assignees: Hyundai Motor Company, Seoul (KR); Kia Motors Corporation, Seoul (KR); Hyundai Kefico Corporation, Gunpo-si (KR)

( * ) Notice: Subject to any disclaimer, the term of this patent is extended or adjusted under 35 U.S.C. 154(b) by 0 days.

(21) Appl. No.: 15/610,518

(22) Filed: May 31, 2017

(65) Prior Publication Data
US 2018/0156091 A1    Jun. 7, 2018

(30) Foreign Application Priority Data
Dec. 6, 2016    (KR) .................. 10-2016-0165287

(51) Int. Cl.
| F01N 9/00 | (2006.01) |
| F01N 3/20 | (2006.01) |
| F01N 3/10 | (2006.01) |
| F01N 11/00 | (2006.01) |

(52) U.S. Cl.
CPC ........... *F01N 3/2006* (2013.01); *F01N 3/101* (2013.01); *F01N 9/00* (2013.01); *F01N 11/002* (2013.01); *F01N 2560/06* (2013.01); *F01N 2900/1602* (2013.01); *F01N 2900/1624* (2013.01); *F01N 2900/1631* (2013.01)

(58) Field of Classification Search
CPC ..... F02D 2200/0814; F02D 2200/0816; F01N 3/0864; F01N 3/101; F01N 2570/16; F01N 2900/1624
See application file for complete search history.

(56) References Cited

U.S. PATENT DOCUMENTS

| 6,336,320 B1 * | 1/2002 | Tanaka ................. F01N 3/0814 123/443 |
| 2008/0173008 A1 * | 7/2008 | Kidokoro ............. F01N 11/002 60/277 |
| 2016/0245207 A1 | 8/2016 | Ball et al. | |

FOREIGN PATENT DOCUMENTS

| JP | 2853554 B2 | 2/1999 |
| KR | 10-0364361 B1 | 11/2002 |

* cited by examiner

*Primary Examiner* — Jonathan Matthias
(74) *Attorney, Agent, or Firm* — Morgan, Lewis & Bockius LLP

(57) ABSTRACT

A method for controlling an exhaust gas purification apparatus according to an exemplary embodiment of the present invention is to improve performance of a three-way catalyst (TWC) purifying exhaust gas exhausted from an engine and includes determining heat load of the three-way catalyst by use of a temperature sensor and an exhaust gas flow rate sensor; measuring oxygen storage capacity (OSC) stored in the three-way catalyst according to the heat load; determining an inflection point by use of change amount of the OSC; and controlling catalyst heating period differently around the inflection point.

9 Claims, 8 Drawing Sheets

EXHAUST GAS PURIFICATION APPARATUS AND METHOD FOR CONTROLLING THE SAME

CROSS-REFERENCE(S) TO RELATED APPLICATIONS

The present application claims priority to Korean Patent Application No. 10-2016-0165287 filed on Dec. 6, 2016, the entire contents of which are incorporated herein for all purposes by this reference.

BACKGROUND OF THE INVENTION

Field of the Invention

The present invention relates to an exhaust gas purification apparatus and method for controlling the same. More particularly, the present invention relates to an exhaust gas purification apparatus and method for controlling the same which controls a catalyst heating period differently to improve performance of a three-way catalyst.

Description of Related Art

Recently, according to an increased usage of vehicles and increased traffic volume, air pollution due to exhaust gas comes to the fore as a serious social problem.

Therefore, governments of every country have set an emission standard of pollutant in exhaust gas such as carbon monoxide (CO), hydrocarbon (HC), nitrogen oxide ($NO_x$) and the like to regulate exhaust gas. Regulations on exhaust gases are becoming more and more strict.

Further, manufacturers of vehicles make a great effort to effectively cope with the strict regulations on exhaust gas. A novel vehicle is manufactured in accordance with an exhaust gas emission standard.

Particularly, to satisfy an exhaust gas emission standard, a three-way catalyst converter in which a noble metal is immersed is mounted in an exhaust system of the vehicle to accelerate the oxidation of hydrocarbon, oxidation of carbon monoxide, and reduction of nitrogen oxide.

The three-way catalyst refers to a catalyst which simultaneously reacts with a hydrocarbon based compound, carbon monoxide, and nitrogen oxide ($NO_x$) which are harmful components of the exhaust gas and remove these compounds. A Pt/Rh, Pd/Rh or Pt/Pd/Rh catalyst is mainly used.

Further, the three-way catalyst performs a function of reducing carbon monoxide and hydrocarbon or reducing nitrogen oxide in response to a change of a lean (excessive oxygen) state and a rich (excessive fuel) state with respect to an air to fuel ratio of exhaust gas.

However, the catalyst performance deteriorates as the three-way catalyst is degrades. However, control of the three-way catalyst is not performed according to a variation in catalyst performance; a catalyst in an exhaust past the warranty period is controlled in the same manner as a new article. Further, when the three-way catalyst is controlled in a region wherein the amount of oxygen storage capacity (OSC) is constant, controlling the three-way catalyst becomes difficult since the catalyst performance variation is large according to the variation of the OSC, and thus catalyst performance deteriorates which generates an increase in emissions, etc.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exhaust gas purification apparatus and method for controlling the same which determines an inflection point by use of a change amount of the OSC and controls the catalyst heating period differently around the inflection point.

A method for controlling an exhaust gas purification apparatus according to an exemplary embodiment of the present invention is configured for improving performance of a three-way catalyst (TWC) purifying exhaust gas expelled from an engine and includes determining heat load of the three-way catalyst by use of a temperature sensor and an exhaust gas flow rate sensor; measuring oxygen storage capacity (OSC) stored in the three-way catalyst according to the heat load; determining an inflection point by use of the change amount of the OSC; and controlling the catalyst heating period differently around the inflection point.

The inflection point may include a point which the decreasing rate of the change amount of the OSC is changed.

In determining an inflection point, the heat load may be determined by accumulating temperature and exhaust gas flow rate of a front end portion of the three-way catalyst, and a decreasing rate of the OSC may be determined by measuring the amount of OSC according to the heat load, and when the absolute value of the decreasing rate of the OSC is below a certain value, it may be determined that the inflection point has past.

In the controlling catalyst heating period differently, when the change amount of the OSC is before the inflection point, the catalyst heating period may be controlled to be increased linearly, and when the change amount of the OSC is after the inflection point, the catalyst heating period may be controlled to have a predetermined set value.

The OSC may be measured using a chemical adsorption method, a simulation activation evaluation device, an engine, or a vehicle.

The OSC during vehicle driving may be measured in a state wherein the three-way catalyst is disposed at the vehicle.

The OSC may be measured by estimating vehicle exhaust gas after aging sequentially according to time at the engine or single part league equipment.

Meanwhile, an exhaust gas purification apparatus according to an exemplary embodiment of the present invention is provided to purify exhaust gas of an engine and includes a three-way catalyst (TWC) disposed at an exhaust line which exhaust gas expelled from the engine passes and changing harmful material including carbon monoxide, hydrocarbon, and nitrogen oxide included in the exhaust gas into harmless components; an oxygen sensor measuring oxygen storage capacity (OSC) stored in the three-way catalyst; and a controller configured to determine the heat load of the three-way catalyst and controlling the catalyst heating period by use of change amount of the OSC according to the heat load.

The controller may determine an inflection point that the decreasing rate of the change amount is changed, and control the catalyst heating period differently around the inflection point.

The controller may control the catalyst heating period to be increased linearly when the change amount of the OSC is before the inflection point, and control the catalyst heating period to have a predetermined set value when the change amount of the OSC is after the inflection point.

As described above, according to an exemplary embodiment of the present invention, optimum control of the three-way catalyst performance is possible, and exhaust gas purification performance may be improved by determining an inflection point using the change amount of the OSC and controlling the catalyst heating period differently around the inflection point.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
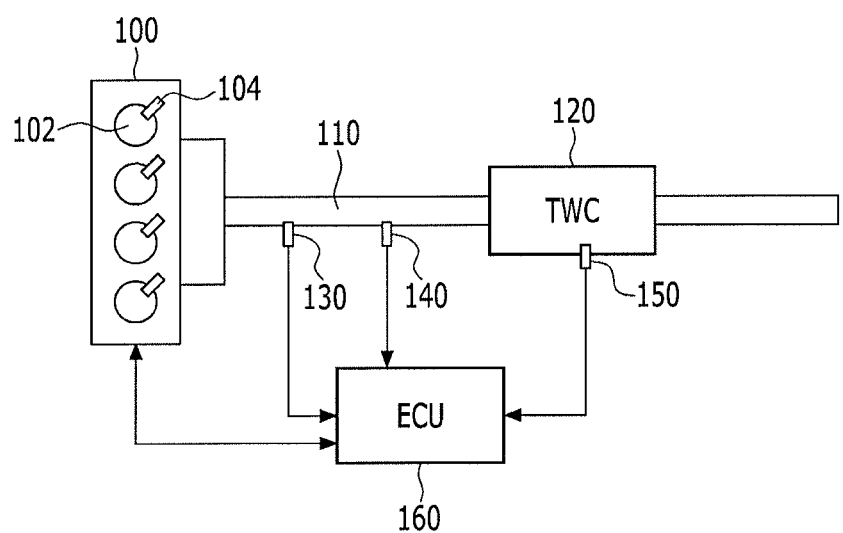
FIG. 1 is a schematic drawing illustrating an exhaust gas purification apparatus for improving three-way catalyst performance according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intend to limit the invention(s) to those exemplary embodiments. On the contrary, the invention(s) is intended to cover not only the exemplary embodiments, but also various alternatives, modifications, equivalents and other embodiments, which may be included with in the spirit and scope of the invention as defined by the appended claims.

It will be understood that when an element is referred to as being "on" or "over" another element, it can be directly on the other element or intervening elements may also be present.

Hereinafter, an exhaust gas purification apparatus and method for controlling the same according to an exemplary embodiment of the present invention will be described with reference to the accompanying drawings.

FIG. 1 is a schematic drawing illustrating an exhaust gas purification apparatus for improving three-way catalyst performance according to an exemplary embodiment of the present invention. The exhaust gas purification apparatus illustrates only a schematic configuration that is needed to describe the exemplary embodiment of the present invention, and is not limited to such a configuration.

Referring to FIG. 1, an exhaust gas purification apparatus according to an exemplary embodiment of the present invention includes an engine 100, a combustion chamber 102, an injector 104, an exhaust line 110, a three-way catalyst (TWC) 120, a lambda sensor 130, a temperature sensor 140, an oxygen sensor 150, and a controller 160.

Outside air is supplied to the combustion chamber 102 of the engine 100, the injector 104 injects a predetermined fuel amount to the combustion chamber 102 at a predetermined time, and the combusted exhaust gas is expelled to the outside through the three-way catalyst 120 of the exhaust line 110.

The three-way catalyst 120 is disposed in the exhaust line 110 which the exhaust gas exhausted from the engine 100 passes, and changes harmful materials including carbon monoxide, hydrocarbon, and nitrogen oxide into harmless materials by an oxidation-reduction reaction.

The lambda sensor 130 is configured to detect the lambda value of the exhaust gas passing through the exhaust line 110, and transmits the present signal to the controller 160. The controller 160 may control the injector 104 using the lambda value and determine whether or not the fuel of the injector 104 is cut.

The temperature sensor 140 is disposed at a front or rear end portion of the three-way catalyst 120, and is configured to measure the temperature of the exhaust gas or the three-way catalyst 120, and supplies the temperature information to the controller 160.

Further, the oxygen sensor 150 is configured to measure an oxygen storage capacity (hereinafter, OSC) and to supply the measured oxygen storage capacity information to the controller 160. Here, it is described that the oxygen sensor 150 is disposed at the three-way catalyst 120, the oxygen sensor 150 may be disposed at a front or rear end portion, and is not limited thereto.

Meanwhile, the OSC may be measured using a chemical adsorption method, a simulation activation evaluation device, an engine, or a vehicle, and the OSC during vehicle driving may be measured in a state that the three-way catalyst is disposed at the vehicle. Also, the OSC may be measured by estimating vehicle exhaust gas after aging sequentially according to time at the engine or single part league equipment.

The controller 160 is configured to determine the heat load of the three-way catalyst by use of information of the temperature and flow rate of the exhaust gas (or air intake amount) measured at the temperature sensor 140, and controls the catalyst heating period by use of the change amount of the OSC according to the heat load.

The controller 160 controls the catalyst heating period to be increased linearly when the change amount of the OSC is before the inflection point. And, controller 160 controls the catalyst heating period to have a predetermined set value when the change amount of the OSC is after the inflection point. Here, the predetermined set value includes predetermined values for maintaining catalyst performance on the basis of a distance value which is the warranty period of the catalyst.

For the present purpose, the controller 160 may be realized by at least one microprocessor operated by a predetermined program, and the predetermined program may be configured to perform respective step of the method for controlling an exhaust gas purification apparatus according to an exemplary embodiment of the present invention.

Figure 2:
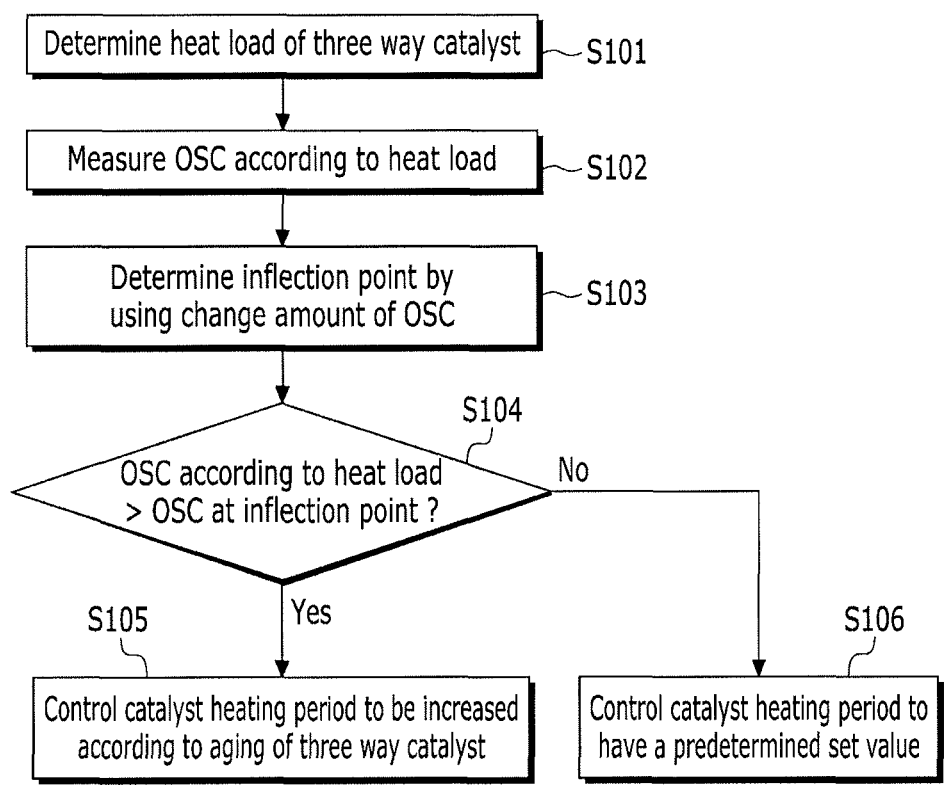
FIG. 2 is a schematic flow chart illustrating that the exhaust gas purification apparatus according to an exemplary embodiment of the present invention controls the catalyst heating period for improving the three-way catalyst performance.

FIG. 2 is a schematic flow chart illustrating that the exhaust gas purification apparatus according to an exemplary embodiment of the present invention controls the catalyst heating period for improving the three-way catalyst performance. The flow chart below is described by use of same reference numerals connected to constituents of FIG. 1.

Referring to FIG. 2, the exhaust gas purification apparatus according to an exemplary embodiment of the present invention determines the heat load of the three-way catalyst 120 using a temperature sensor and an exhaust gas flow rate sensor S101.

Then, the exhaust gas purification apparatus measures oxygen storage capacity (OSC) stored in the three-way catalyst according to the heat load S102.

The exhaust gas purification apparatus determines an inflection point using the change amount of the OSC S103. Here, the inflection point includes a point that the decreasing rate of the change amount of the OSC is changed. The inflection point may include a point in which reducing tendency according to catalyst aging time is critically and smoothly reduced.

The exhaust gas purification apparatus determines the heat load by accumulating temperature and exhaust gas flow rate of a front end portion of the three-way catalyst, and a decreasing rate of the OSC by measuring the amount of the OSC according to the heat load. Further, the exhaust gas purification apparatus may determine that the inflection point is past when the absolute value of the decreasing rate of the OSC is below a certain value.

Further, the exhaust gas purification apparatus may control the catalyst heating period according to the three-way catalyst aging when the OSC value according to the heat load is bigger than the OSC value of the inflection point S104 and S105.

Further, the exhaust gas purification apparatus may control that the control variable has a predetermined set value when the OSC value is smaller than the OSC value of the inflection point S104 and S106. Here, the predetermined set value includes predetermined values for maintaining catalyst performance on the basis of a distance value which is the warranty period of the catalyst.

Figure 3:
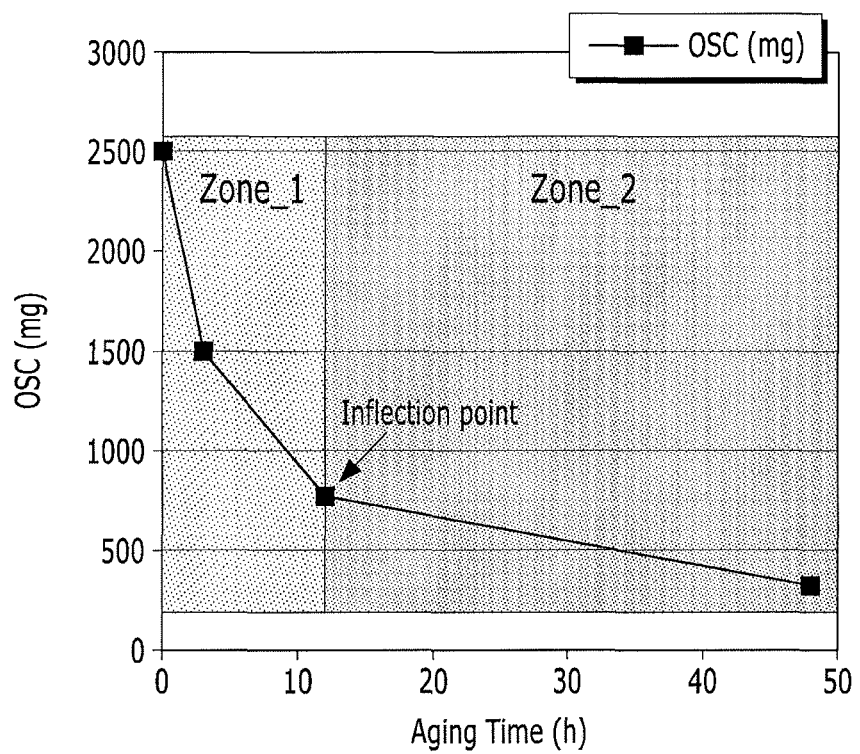
FIG. 3 is a graph illustrating variation of OSC according to aging of the three-way catalyst according to an exemplary embodiment of the present invention.

FIG. 3 is a graph illustrating variation of OSC according to aging of the three-way catalyst according to an exemplary embodiment of the present invention.

The amount of the OSC of the three-way catalyst reduces rapidly according to degradation at an initial stage and the amount of the OSC reduces smoothly after a certain time. Accordingly, there is an inflection point which variation tendency of the OSC changes as shown in FIG. 3, and it may be divided to a region that the OSC reduces rapidly (Zone_1) and a region that the OSC reduces smoothly (Zone_2) on the basis of the inflection point.

Before the inflection point (Zone_1), variation of the OSC according to aging time is large, but EM effect according to the variation of the OSC is small, so controlling control variable related to performance of the three-way catalyst, that is, the catalyst heating time is easy.

However, after the inflection point (Zone_2), variation of the OSC according to aging time is small, but EM effect according to the variation of the OSC is sensitive, so controlling control variable related to performance of the three-way catalyst, that is, the catalyst heating time is difficult.

Figure 5:
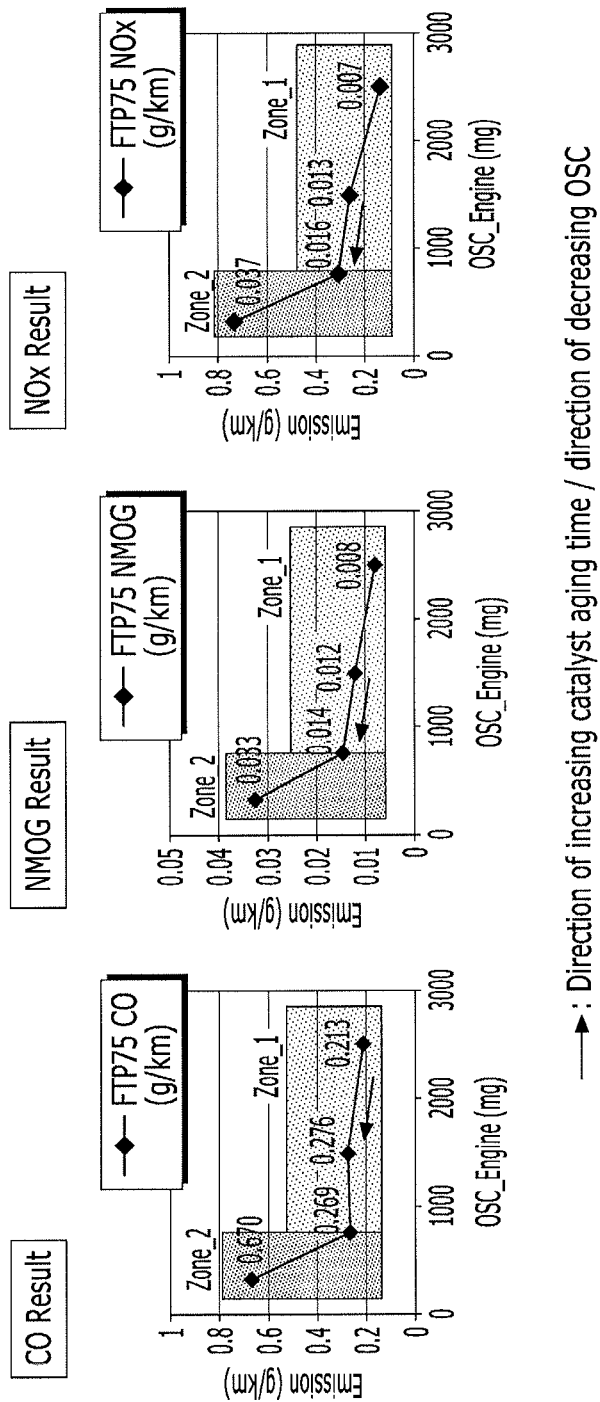
FIG. 5 is a graph illustrating the relationship of variation of the OSC of the three-way catalyst and emissions (EM).

FIG. 5 is a graph illustrating the relationship of variation of the OSC of the three-way catalyst and EM.

Referring to FIG. 5, variation of the OSC according to the three-way catalyst aging time is large around the inflection point, and variation of the EM increases as aging time of the three-way catalyst increases and as the OSC decreases. Further, the variation tendency of the EM is more sensitive after the inflection point (Zone_2) than before the inflection point (Zone_1).

Figure 6:
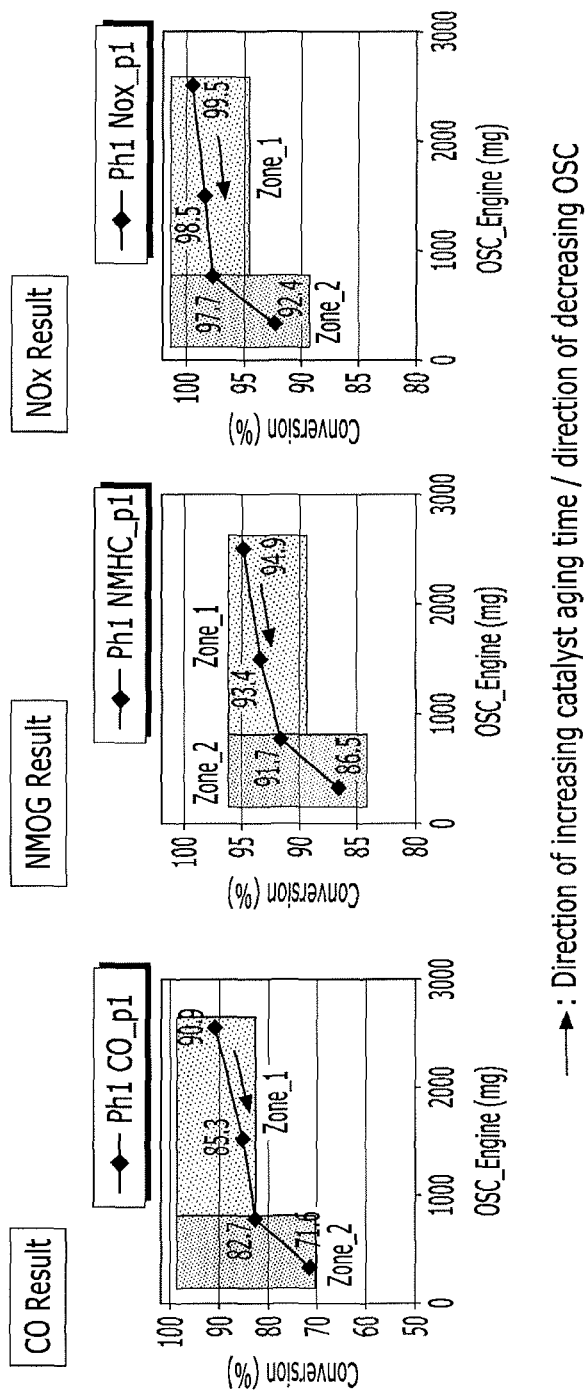
FIG. 6 is a graph comparing exhaust gas purification performances according to a variation of the OSC of the three-way catalyst.

FIG. 6 is a graph comparing exhaust gas purification performances according to a variation of the OSC of the three-way catalyst.

Referring to FIG. 6, variation of the OSC according to the three-way catalyst aging time is large around the inflection point, and exhaust gas purification performance decreases as aging time of the three-way catalyst increases and as the OSC decreases. Accordingly, the exhaust gas purification performance varies on the basis of the inflection point, and the purification performance is more reduced after the inflection point (Zone_2) than before the inflection point (Zone_1).

Figure 7:
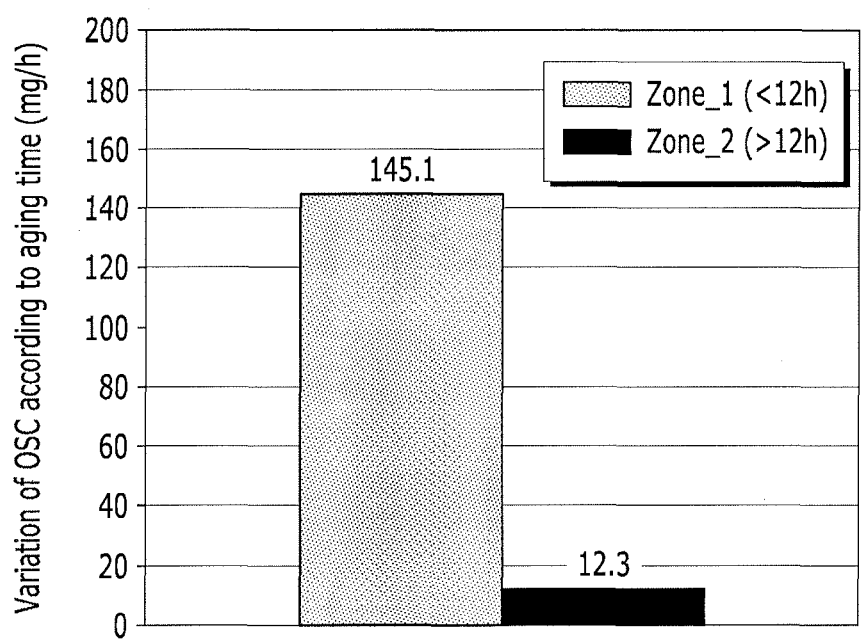
FIG. 7 is a graph illustrating variation of the OSC according to aging time of the three-way catalyst in a respective control region according to an exemplary embodiment of the present invention.
Figure 8:
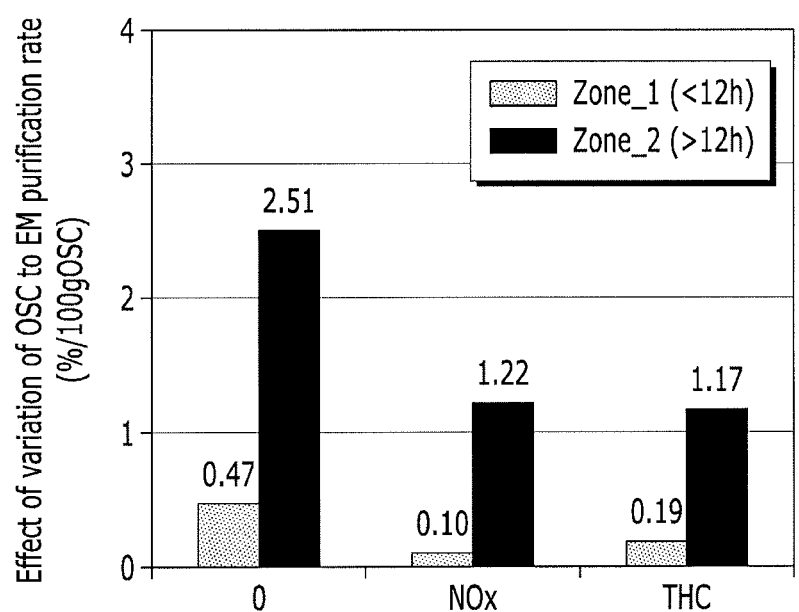
FIG. 8 is a graph illustrating effects that variation of the OSC affects the exhaust gas purification performance.

FIG. 7 is a graph illustrating the variation of the OSC according to aging time of the three-way catalyst in a respective control region according to an exemplary embodiment of the present invention, and FIG. 8 is a graph illustrating the effects that variation of the OSC affects the exhaust gas purification performance.

Referring to FIG. 7, decreasing amount of the OSC varies on the basis of the inflection point, and the variation tendency is different before the inflection point (Zone_1) and after the inflection point (Zone_2). Before the inflection point (Zone_1), decreasing rate of the OSC is large, and after the inflection point (Zone_2), decreasing rate of the OSC is small.

However, referring to FIG. 8, the effects that the variation of the amount of the OSC affects the variation of the EM is not sensitive before the inflection point (Zone_1), but the effects that the variation of the amount of the OSC affects the variation of the EM is sensitive after the inflection point (Zone_2).

Figure 4:
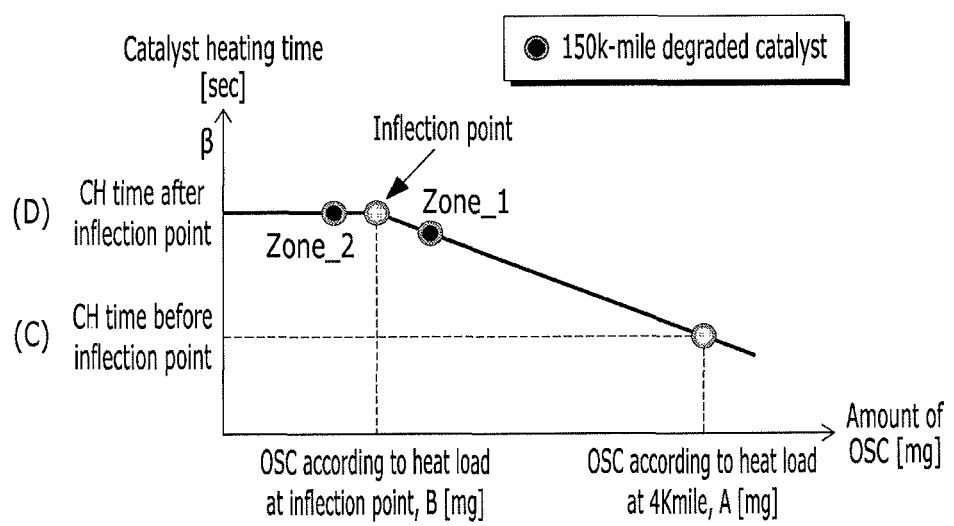
FIG. 4 is a graph illustrating an example of the catalyst heating period in a respective control region according to the inflection point of FIG. 3.

Accordingly, the exhaust gas purification apparatus according to an exemplary embodiment of the present invention controls the catalyst heating period related to performance of the three-way catalyst on the basis of the inflection point, as shown in FIG. 4.

For example, before the inflection point (Zone_1), the catalyst heating period (C) is controlled to be increased linearly according to amount of the OSC (A) according to the heat load of the catalyst.

Further, after the inflection point (Zone_2), the catalyst heating period (D) is controlled to have a predetermined set value according to amount of the OSC (B) according to the heat load at the inflection point.

As described above, according to an exemplary embodiment of the present invention, optimum control of the three-way catalyst performance is possible and exhaust gas purification performance may be improved by determining an inflection point by use of change amount of the OSC and controlling catalyst heating period differently around the inflection point.

For convenience in explanation and accurate definition in the appended claims, the terms "upper", "lower", "internal", "outer", "up", "down", "upwards", "downwards", "front", "back", "rear", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purpose of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others killed in the art to make and utilize various exemplary embodiments of the presenting invention, as well as various alternatives ad modifications thereof. It is intended that the scope of the invention be defined by the Claims appended hereto and their equivalents.

What is claimed is:

1. A method for controlling an exhaust gas purification apparatus to improve performance of a three-ways catalyst (TWC) purifying exhaust gas exhausted from an engine, comprising:
   determining heat load of the three-way catalyst by use of a temperature sensor and an exhaust gas flow rate sensor;
   measuring oxygen storage capacity (OSC) stored in the three-way catalyst according to the heat load;
   determining an inflection point by use of a change amount of the OSC; and
   controlling a catalyst heating period differently around the inflection point.

2. The method of claim 1, wherein
the inflection point includes a point that decreasing rate of the change amount of the OSC is changed.

3. The method of claim 1, wherein
in the determining of the inflection point,
the heat load is configured to be determined by accumulating temperature and exhaust gas flow rate of a front end portion of the three-way catalyst, and a decreasing rate of the OSC is configured to be determined by measuring an amount of the OSC according to the heat load, and when an absolute value of the decreasing rate of the OSC is below a predetermined value, it is determined that the inflection point has past.

4. The method of claim 1, wherein
in the controlling catalyst heating period differently,
when the change amount of the OSC is before the inflection point, the catalyst heating period is configured to be controlled to be increased linearly; and
when the change amount of the OSC is after the inflection point, the catalyst heating period is configured to be controlled to have a predetermined set value.

5. The method of claim 1, wherein
the OSC is measured by use of a chemical adsorption method, a simulation evaluation device, the engine, or a vehicle.

6. The method of claim 1, wherein
the OSC during vehicle driving is measured in a state that the three-way catalyst is disposed in an exhaust line of the engine mounted at the vehicle.

7. The method of claim 1, wherein
the OSC is measured by estimating vehicle exhaust gas according to aging of the engine.

8. An exhaust gas purification apparatus provided to purify exhaust gas of an engine, comprising:
   a three-way catalyst (TWC) disposed at an exhaust line which exhaust gas exhausted from the engine is configured to pass and changing harmful material including carbon monoxide, hydrocarbon and nitrogen oxide included in the exhaust gas to harmless components;
   an oxygen sensor configured for measuring an oxygen storage capacity (OSC) stored in the three-way catalyst; and
   a controller configured for determining heat load of the three-way catalyst and controlling catalyst heating period by use of change amount of the OSC according to the heat load,
   wherein the controller is configured to determine an inflection point in which decreasing rate of the change amount is changed and controls catalyst heating period differently around the inflection point.

9. The exhaust gas purification apparatus of claim 8, wherein
the controller is configured to control the catalyst heating period to be increased linearly when the change amount of the OSC is before the inflection point, and
controls the catalyst heating period to have a predetermined set value when the change amount of the OSC is after the inflection point.

* * * * *